United States Patent
Chen (10) Patent No.: US 11,888,644 B2
(45) Date of Patent: Jan. 30, 2024

(54) NETWORK CONFIGURATION METHOD FOR HOME APPLIANCE, HOME APPLIANCE, MOBILE TERMINAL, AND STORAGE MEDIUM

(71) Applicants: GD MIDEA AIR-CONDITIONING EQUIPMENT CO., LTD., Foshan (CN); MIDEA GROUP CO., LTD., Foshan (CN)

(72) Inventor: Junji Chen, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 300 days.

(21) Appl. No.: 17/423,034

(22) PCT Filed: Mar. 28, 2019

(86) PCT No.: PCT/CN2019/080218
§ 371 (c)(1),
(2) Date: Jul. 14, 2021

(87) PCT Pub. No.: WO2020/155360
PCT Pub. Date: Aug. 6, 2020

(65) Prior Publication Data
US 2022/0239524 A1 Jul. 28, 2022

(30) Foreign Application Priority Data
Jan. 31, 2019 (CN) .......................... 201910102510.2

(51) Int. Cl.
*H04L 12/28* (2006.01)
*H04W 48/16* (2009.01)

(52) U.S. Cl.
CPC ......... *H04L 12/2818* (2013.01); *H04W 48/16* (2013.01); *H04L 2012/2841* (2013.01)

(58) Field of Classification Search
None
See application file for complete search history.

(56) References Cited

U.S. PATENT DOCUMENTS

| | | | | |
|---|---|---|---|---|
| 2007/0211629 A1* | 9/2007 | Mori | ..................... | H04W 48/18 370/230 |
| 2015/0089624 A1* | 3/2015 | Kim | ..................... | G06F 21/335 726/9 |

(Continued)

FOREIGN PATENT DOCUMENTS

| CN | 101986738 A | 3/2011 |
|---|---|---|
| CN | 106162828 A | 11/2016 |

(Continued)

OTHER PUBLICATIONS

The China National Intelleectual Property Administration (CNIPA) The First Office Action for 201910102510.2 dated Jan. 2, 2020 19 Pages (With translation).

(Continued)

*Primary Examiner* — Benjamin Lamont
(74) *Attorney, Agent, or Firm* — Anova Law Group, PLLC (57) ABSTRACT

A network configuration method includes receiving, by a home appliance through Bluetooth communication, mobile terminal information and network access information of a wireless network access point sent by a mobile terminal, accessing the wireless network access point according to the network access information, and sending the mobile terminal information to a server for the server to send a message of successful network configuration of the home appliance to the mobile terminal upon confirming a success of network configuration of the home appliance.

20 Claims, 2 Drawing Sheets

(56) References Cited

U.S. PATENT DOCUMENTS

| | | | | |
|---|---|---|---|---|
| 2015/0097669 A1* | 4/2015 | Li | ................. | G08B 21/24 |
| | | | | 455/435.1 |
| 2016/0037332 A1* | 2/2016 | Egeler | ................. | H04W 4/029 |
| | | | | 455/420 |
| 2016/0249397 A1* | 8/2016 | Seok | ................. | H04L 1/0075 |
| 2016/0277923 A1* | 9/2016 | Steffey | ................. | H04W 12/04 |
| 2019/0052476 A1 | 2/2019 | Shu et al. | | |
| 2019/0116087 A1* | 4/2019 | Hiller | ................. | H04W 4/70 |
| 2019/0246346 A1* | 8/2019 | Huang | ................. | H04L 12/2838 |
| 2020/0196358 A1* | 6/2020 | Kim | ................. | H04W 8/005 |
| 2021/0075636 A1* | 3/2021 | Yang | ................. | F25D 29/00 |

FOREIGN PATENT DOCUMENTS

| | | |
|---|---|---|
| CN | 106211205 A | 12/2016 |
| CN | 107241784 A | 10/2017 |
| CN | 107276866 A | 10/2017 |
| CN | 107465584 A | 12/2017 |
| WO | 2017129124 A1 | 8/2017 |

OTHER PUBLICATIONS

The China National Intelleectual Property Administration (CNIPA) The Second Office Action for 201910102510..2 dated Apr. 28, 2020 20 Pages (With translation).
World Intellectual Property Organization (WIPO) International Search Report and Written Opinion for PCT/CN2019/080218 dated Mar. 28, 2019 14 pages (with translation).
The European Patent Office (Epo) Extended Search Report for EP Application No. 19913801.7 dated Feb. 24, 2022 8 Pages.

* cited by examiner

NETWORK CONFIGURATION METHOD FOR HOME APPLIANCE, HOME APPLIANCE, MOBILE TERMINAL, AND STORAGE MEDIUM

CROSS-REFERENCE TO RELATED APPLICATIONS

The present application is a National Stage Entry under 35 U.S.C. § 371 of International Application No. PCT/CN2019/080218, filed on Mar. 28, 2019, which claims priority to Chinese patent application No. 201910102510.2 filed on Jan. 31, 2019 and entitled "Network Configuration Method for Home Appliance, Home Appliance, Mobile Terminal, and Storage Medium." The disclosures of the aforementioned applications are hereby incorporated by reference in their entireties.

TECHNICAL FIELD

The present application relates to the field of network communication, in particular to a network configuration method for home appliance, a home appliance, a mobile terminal, and a computer readable storage medium.

BACKGROUND

With the development of Mobile Internet and Internet of Things, more and more home appliances have wireless network access functions, such as smart TVs, smart refrigerators, smart air conditioners, smart plugs, smart rice cookers, etc. When a home appliance is connected to the wireless network for the first time, it is generally needed to carry out corresponding network configuration for the home appliance. At present, the network configuration of the home appliance is mainly realized through the remote controller or operation panel of the home appliance. However, due to the limitation of keys of the remote controller or operation panel, the configuration operation is very complicated, time-consuming and laborious.

SUMMARY

The main purpose of the present application is to provide a network configuration method for home appliance, a home appliance, a mobile terminal, and a computer readable storage medium, which are convenient for users to configure networks of home appliances.

In order to realize the above purpose, the present application provides a network configuration method for home appliance, which includes the following steps:
  receiving, by a home appliance through Bluetooth communication, mobile terminal information and network access information of a wireless network access point sent by a mobile terminal;
  accessing the wireless network access point according to the network access information; and
  sending the mobile terminal information to a server, where the server is configured to send a message of successful network configuration of the home appliance to the mobile terminal upon confirming a success of network configuration of the home appliance.

Optionally, the network configuration method for home appliance further includes:
  upon receiving a network configuration instruction sent from the mobile terminal through the Bluetooth communication, the home appliance searching for an accessible wireless network access point and generating information of the wireless network access point; and
  sending the information of the wireless network access point to the mobile terminal through the Bluetooth communication, where the mobile terminal is configured to generate the network access information of the wireless network access point based on the information of the wireless network access point.

Optionally, prior to the step of receiving, by a home appliance through Bluetooth communication, mobile terminal information and network access information of a wireless network access point sent by a mobile terminal, the method further includes:
  upon receiving a network configuration instruction, determining whether the network configuration instruction is a Bluetooth network configuration instruction; and
  upon determining that the network configuration instruction is a Bluetooth network configuration instruction, executing the step of receiving, by a home appliance through Bluetooth communication, mobile terminal information and network access information of a wireless network access point sent by a mobile terminal.

Optionally, after the step of accessing the wireless network access point according to the network access information, the method further includes:
  upon failing to access the wireless network, sending a network configuration failure prompt message to the mobile terminal through the Bluetooth communication.

In order to achieve the above purpose, the present application also provides a home appliance, the home appliance includes:
  a processor and a network configuration program for home appliance stored in the memory and executable by the processor. When the network configuration program for home appliance is executed by the processor, the steps of the network configuration method for home appliance described above are realized.

In order to realize the above purpose, the present application provides a network configuration method for home appliance, which includes the following steps:
  sending, by a mobile terminal, network access information of a wireless network access point and mobile terminal information to a home appliance through Bluetooth communication, where the home appliance is configured to send the mobile terminal information to a server upon accessing the wireless network access point according to the network access information; and
  receiving and displaying, by the mobile terminal, a message of successful network configuration of the home appliance sent from the server, where the message of successful network configuration of the home appliance is sent by the server according to the mobile terminal information after confirming a success of the network configuration of the home appliance.

Optionally, the network configuration method for home appliance further includes:
  sending, by the mobile terminal, a network configuration instruction to the home appliance, to configure the home appliance to search for an accessible wireless network access point and generate information of the wireless network access point; and
  receiving the information of the wireless network access point sent from the home appliance through the Bluetooth communication, and generating the network access information of the wireless network access point based on the information of the wireless network access point.

Optionally, after the step of sending, by a mobile terminal, network access information of a wireless network access point and mobile terminal information to a home appliance through Bluetooth communication, the method further includes:

regularly sending, by the mobile terminal, an inquiry request to the server to obtain the message of successful network configuration of the home appliance.

Optionally, after the step of sending, by a mobile terminal, network access information of a wireless network access point and mobile terminal information to a home appliance through Bluetooth communication, the method further includes:

upon failing to receive the message of successful network configuration of the home appliance from the server within a preset time period, generating and displaying a network configuration failure message.

To achieve the above purpose, the present application also provides a mobile terminal, the mobile terminal including:

a memory, a processor, and a network configuration program for home appliance stored in the memory and executable by the processor. When the network configuration program for home appliance is executed by the processor, the steps of the network configuration method for home appliance described above are realized.

In order to achieve the above object, the present application also provides a computer readable storage medium storing a network configuration program for home appliance which, when executed by a processor, implements the steps of the network configuration method for home appliance described above.

The present application provides a network configuration method for home appliance, a home appliance, and a computer readable storage medium. A home appliance receives mobile terminal information and network access information of a wireless network access point sent by a mobile terminal through Bluetooth communication, accesses the wireless network access point according to the network access information to establish network communication, and sends the mobile terminal information to a server through the network communication, for the server to confirm a success of network configuration of the home appliance, and to send a message of successful network configuration of the home appliance to the mobile terminal corresponding to the mobile terminal information. In this way, it is convenient for users to carry out network configuration on home appliances.

The realization of the purposes, functional features, and advantages of the present application will be further explained with reference to the accompanying drawings in combination with the embodiments.

DETAILED DESCRIPTION OF THE EMBODIMENTS

It should be understood that the specific embodiments described herein are for explanatory purposes only and are not intended to limit the present application.

The present application provides a network configuration method for home appliance, which facilitates users to configure network of home appliances.

Figure 1:
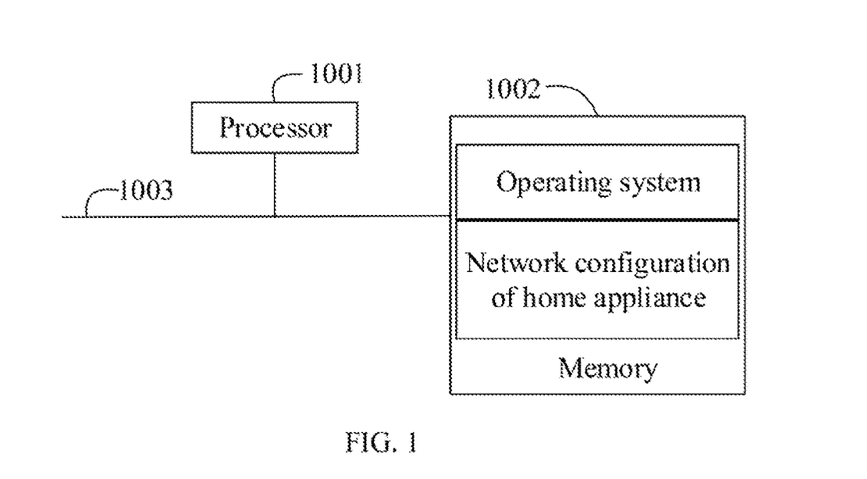
FIG. 1 is a schematic diagram of a hardware operation environment of an example terminal according to embodiments of the present application.

As shown in FIG. 1, FIG. 1 is a schematic diagram of a hardware operation environment of an example terminal involved in embodiments of the present application.

An example terminal of the present application may be a home appliance or a mobile terminal, a server, a control terminal, or the like.

As shown in FIG. 1, the terminal may include a processor 1001, such as a central processing unit, a memory 1002, and a communication bus 1003. The communication bus 1003 is used to realize the connection and communication between components of the terminal. The memory 1002 may be a high-speed random access memory (RAM) or a non-volatile memory, such as a magnetic disk memory. The memory 1002 may optionally be a storage device independent of the processor 1001 described above.

As will be understood by those skilled in the art, the structure of the terminal shown in FIG. 1 does not constitute a limitation on the terminal of the embodiments of the present application, which may include more or fewer components than illustrated, or a combination of certain components, or a different arrangement of components.

As shown in FIG. 1, the memory 1002, which is a computer storage medium, may include a network configuration program for home appliance.

In the terminal shown in FIG. 1, the processor 1001 can be configured to invoke the network configuration program for home appliance stored in the memory 1002 and perform the following operations:

receiving, by a home appliance through Bluetooth communication, mobile terminal information and network access information of a wireless network access point sent by a mobile terminal;

accessing the wireless network access point according to the network access information to establish network communication;

sending the mobile terminal information to a server, where the server is configured to send a message of successful network configuration of the home appliance to the mobile terminal upon confirming the successful network configuration of the home appliance network.

Optionally, the processor 1001 can invoke the network configuration program for home appliance stored in the memory 1002, and also perform the following operations:

upon receiving a network configuration instruction sent from the mobile terminal through the Bluetooth communication, the home appliance searching for an accessible wireless network access point and generating the information of the wireless network access point;

sending information of the wireless network access point to the mobile terminal through the Bluetooth communication, thereby the mobile terminal generates the network access information of the wireless network access point based on the information of the wireless network access point.

Optionally, the processor 1001 can invoke the network configuration program for home appliance stored in the memory 1002, and also perform the following operations:

upon receiving a network configuration instruction, determining whether the network configuration instruction is a Bluetooth network configuration instruction;

upon determining that the network configuration instruction is a Bluetooth network configuration instruction, executing the step of receiving, by a home appliance through Bluetooth communication, mobile terminal information and network access information of a wireless network access point sent by a mobile terminal.

Optionally, the processor 1001 can invoke the network configuration program for home appliance stored in the memory 1002, and also perform the following operations:

upon failing to access the wireless network, sending a network configuration failure prompt message to the mobile terminal through the Bluetooth communication.

Optionally, the processor 1001 can invoke the network configuration program for home appliance stored in the memory 1002, and also perform the following operations:

sending, by a mobile terminal, the network access information of the wireless network access point and the mobile terminal information to the home appliance through the Bluetooth communication, where the home appliance is configured to send the mobile terminal information to the server upon accessing the wireless network access point according to the network access information;

receiving and displaying, by the mobile terminal, the message of successful network configuration of the home appliance sent from the server, where the message of successful network configuration of the home appliance is sent by the server according to the mobile terminal information after confirming a success of the network configuration of the home appliance.

Optionally, the processor 1001 can invoke the network configuration program for home appliance stored in the memory 1002, and also perform the following operations:

sending, by the mobile terminal, the network configuration instruction to the home appliance, thereby the home appliance searches for the accessible wireless network access point and generates the information of the wireless network access point;

receiving the information of the wireless network access point sent from the home appliance through the Bluetooth communication, and generating the network access information of the wireless network access point based on the information of the wireless network access point.

Optionally, the processor 1001 can invoke the network configuration program for home appliance stored in the memory 1002, and also perform the following operations:

regularly sending, by the mobile terminal, an inquiry request to the server to obtain the message of successful network configuration of the home appliance.

Optionally, the processor 1001 can invoke the network configuration program of the home appliance stored in the memory 1002, and also perform the following operations:

upon failing to receive the message of successful network configuration of the home appliance from the server within a preset time period, generating and displaying a network configuration failure message.

Figure 2:
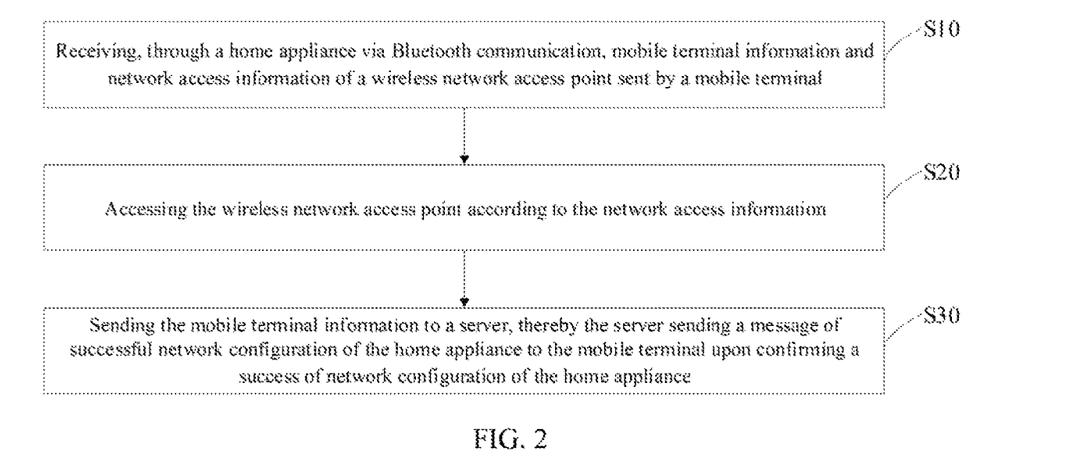
FIG. 2 is a schematic flow diagram of a first embodiment of a network configuration method for home appliance according to the present application.

Referring to FIG. 2, in an embodiment, the network configuration method for home appliance includes:

Step S10, receiving, by a home appliance through Bluetooth communication, mobile terminal information and network access information of a wireless network access point sent by a mobile terminal.

Step S20, accessing the wireless network access point according to the network access information.

In this embodiment, the example terminal of this embodiment is a home appliance. The home appliance can be a television, an electric fan, an air conditioner, a washing machine, or another home appliance. All of the above home appliances have Bluetooth communication function, which can be realized by built-in or external Bluetooth circuits. The mobile terminal can be a mobile intelligent terminal such as a mobile phone or a tablet.

Optionally, the home appliance provides a plurality of network configuration modes, each network configuration mode has a corresponding network configuration instruction, where the network configuration instruction corresponding to the Bluetooth network configuration mode is a Bluetooth network configuration instruction, and the network configuration instruction corresponding to the WIFI network configuration mode is a WIFI network configuration instruction.

Figure 4:
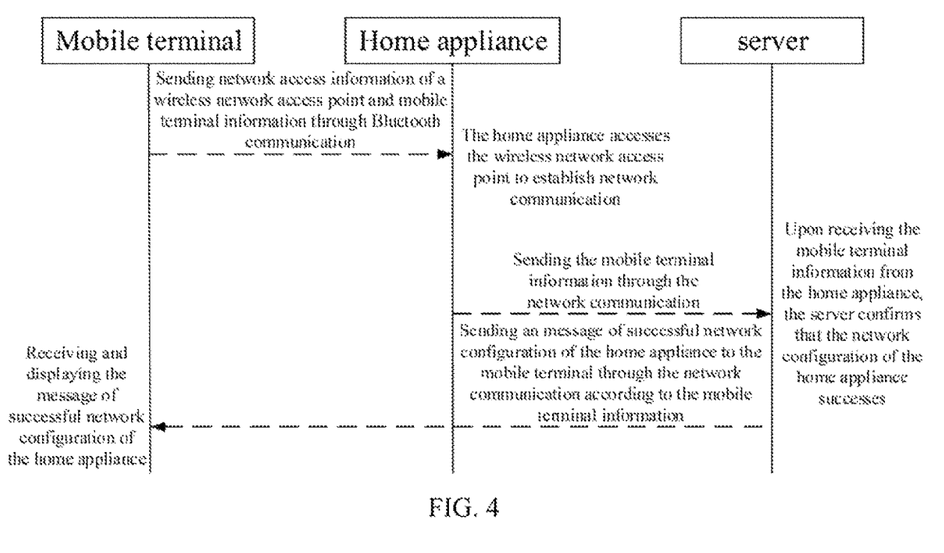
FIG. 4 is an example diagram of three-terminal interaction of the network configuration method for home appliance according to the present application.

Referring to FIG. 4, optionally, upon receiving a network configuration instruction, the home appliance determines whether the network configuration instruction is a Bluetooth network configuration instruction. If yes, the home appliance receives the mobile terminal information corresponding to the mobile terminal and the network access information of the wireless network access point sent from the mobile terminal through the Bluetooth communication. The mobile terminal information may be account information of a user of the mobile terminal registered on a home appliance server, device information of the mobile terminal (such as the device ID number, the device serial number, and the associated mobile phone number, etc.). The network access information of the wireless network access point includes a service set identifier (SSID) name of the wireless network access point which the current home appliance needs access, and of course, when the access of the wireless network access point needs a password, the network access information also includes password information corresponding to the wireless network access point. If not, the home appliance receives the mobile terminal information and the network access information of the wireless network access point sent from the mobile terminal according to a transmission specification of the network configuration mode corresponding to the current network configuration instruction. For example, when the network configuration instruction is the WIFI network configuration instruction, the home appliance turns on a WIFI module and establishes WIFI transmission with the mobile terminal, and receives the mobile terminal information and the network access information of the wireless network access point sent from the mobile terminal through WIFI communication.

Optionally, when the home appliance receives the network configuration instruction sent from the mobile terminal, the home appliance turns on the WIFI module to search for a wireless network, so as to detect a currently accessible wireless network access point, generate information of the detected currently accessible wireless network access point, and send the information of the wireless network access point to the mobile terminal through the Bluetooth communication. When the mobile terminal receives the relevant information of the wireless network access point sent from the home appliance, the mobile terminal generates and displays a wireless network access point setting UI interface (the UI interface includes a display list of wireless network access points accessible by the home appliance) according to the received information of the wireless network access point. In this way, the user can select a wireless network access point based on the UI interface according to actual needs, and input a password corresponding to a selected wireless network access point. The mobile terminal generates the network access information of the wireless network access point according to the operation triggered by the user based on the UI interface, and sends the network access information of the wireless network access point and the mobile terminal information to the home appliance through the Bluetooth communication.

Optionally, after the mobile terminal establishes the Bluetooth communication with the home appliance, the mobile terminal can send a Bluetooth network configuration data packet to the home appliance through the Bluetooth communication, and the home appliance directly performs network configuration operation after receiving the Bluetooth network configuration data packet. The Bluetooth network configuration data packet includes the mobile terminal information and the network access information of the wireless network access point.

After receiving the mobile terminal information and the network access information of the wireless network access point transmitted from the mobile terminal through the Bluetooth communication, the home appliance can access the wireless network access point corresponding to the network access information to establish a network connection.

It should be noted that, in this way, when the network configuration of the home appliance is carried out for the first time (the network connection is not successfully established), network configuration data sent from the mobile terminal are received through the Bluetooth communication, and the communication between the home appliance and the mobile terminal can be realized.

Step S30, sending the mobile terminal information to a server, where the server is configured to send a message of successful network configuration of the home appliance to the mobile terminal upon confirming a success of network configuration of the home appliance.

The home appliance may send the mobile terminal information received from the mobile terminal to the server after the network communication is successfully established, or directly send the mobile terminal information to the server after the wireless network access point is successfully accessed. After receiving the mobile terminal information sent from the home appliance, the server can determine that the network configuration of the home appliance is successful. It should be noted that the server may be a dedicated online home appliance server, such as a home appliance server established by a home appliance manufacturer for providing online services of home appliances for a large number of users.

After determining that the network configuration of the home appliance is successful, the server can obtain the appliance information of the home appliance whose network configuration is successful at present, generate the message of successful network configuration of the home appliance corresponding to the appliance information, and then send the message of successful network configuration of the home appliance to the mobile terminal according to the mobile terminal information received from the home appliance. After receiving the message of successful network configuration of the home appliance pushed by the server, the mobile terminal displays the message of successful network configuration of the home appliance to prompt the user that the network configuration of the current home appliance has been successfully conducted.

In the existing technology, when a home appliance is successfully connected to a wireless network access point, it generally deems that the network configuration of the home appliance is successful, ignoring the possibility that the home appliance is only connected to the wireless network access point without establishing a real network communication connection (such as connecting to a server for online interaction and etc.), resulting in wrong determination of the network configuration. The server confirms the success of the network configuration of the home appliance, which can improve the stability of the network configuration of the home appliance and make the determining of the success of the network configuration of the home appliance more accurate.

Optionally, upon receiving the mobile terminal information sent from the home appliance, the server acquires the appliance information of the home appliance and associates the appliance information with the mobile terminal information. Then, when the server receives a control instruction of controlling the home appliance sent from the mobile terminal, the server searches the associated appliance information according to the mobile terminal information corresponding to the mobile terminal, and sends the control instruction to the home appliance corresponding to the appliance information for the home appliance to execute the control instruction. In this way, the security of interaction between mobile terminals and home appliances can be improved, and illegal control of the home appliances by unknown mobile terminals can be prevented.

Optionally, the mobile terminal transmits the mobile terminal information and the network access information of the wireless network access point to the home appliance through the Bluetooth communication, and simultaneously transmits the mobile terminal information to the server. When the server receives the mobile terminal information transmitted from the home appliance, the server searches whether corresponding mobile terminal information is stored. If so, the server acquires the appliance information of the home appliance whose network configuration is successful, generates the message of successful network configuration of the home appliance corresponding to the appliance information, and then send the message of successful network configuration of the home appliance to the mobile terminal according to the mobile terminal information received from the home appliance. If not, it means that the home appliance does not have access to the server, and the server will not process it. In this way, the security of interaction among mobile terminals, home appliances and servers can be improved. Optionally, after the server receives the mobile terminal information sent from the mobile terminal, if no mobile terminal information corresponding to the mobile terminal information sent from the mobile terminal is received from the home appliance within a preset time period, a network configuration failure prompt message can be directly generated and pushed to the mobile terminal. It should be noted that the preset time period can be a preset network configuration duration, which can be 10 minutes, 15 minutes, 20 minutes, 30 minutes, or the like.

Optionally, when the home appliance fails to access the wireless network point, the home appliance determines that the wireless network connection fails, generates the network configuration failure prompt message, and sends the network configuration failure prompt message to the mobile terminal through the Bluetooth communication.

The mobile terminal displays the received network configuration failure prompt message to prompt the user that the current network configuration of the home appliance fails.

In one embodiment, a home appliance receives mobile terminal information and network access information of a wireless network access point sent from a mobile terminal through Bluetooth communication, accesses the wireless network access point according to the network access information to establish network communication, sends the mobile terminal information to a server, where the server is configured to send a message of successful network configuration of the home appliance to the mobile terminal upon confirming the success of the network configuration of the home appliance. In this way, it is convenient for users to configure the network of home appliances, simplifies the conventional network configuration operation based on the control panel or the remote controller of the home appliances, and improves the network configuration experience of the users.

Figure 3:
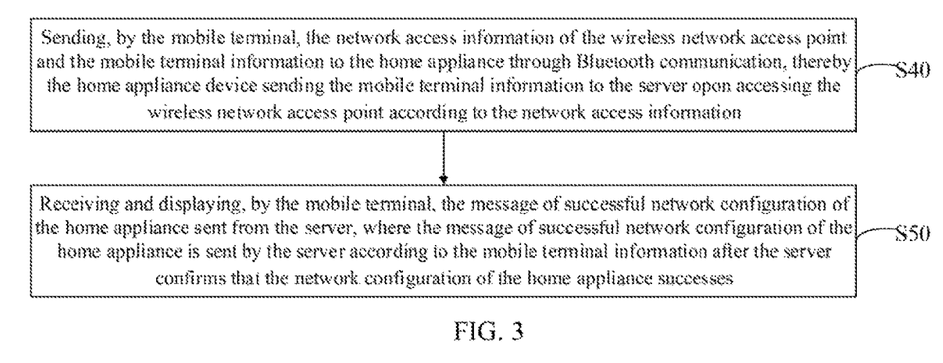
FIG. 3 is a schematic flow diagram of a second embodiment of the network configuration method for home appliance according to the present application.

In a second embodiment, as shown in FIG. 3, on the basis of the embodiment shown in FIG. 2, the network configuration method for home appliance includes following steps:

Step 40, sending, by the mobile terminal, the network access information of the wireless network access point and the mobile terminal information to the home appliance through the Bluetooth communication, where the home appliance is configured to send the mobile terminal information to the server upon accessing the wireless network access point according to the network access information.

Step S50, receiving and displaying, by the mobile terminal, the message of successful network configuration of the home appliance sent from the server, where the message of successful network configuration of the home appliance is sent by the server according to the mobile terminal information after the server confirms that the network configuration of the home appliance succeeds.

In this embodiment, the example terminal of this embodiment is the mobile terminal. The mobile terminal can be a mobile intelligent terminal such as a mobile phone or a tablet. The home appliance can be a television, an electric fan, an air conditioner, a washing machine, or another home appliance. All home appliances have Bluetooth communication function, which can be realized by built-in or external Bluetooth circuits. Optionally, the home appliance provides a plurality of network configuration modes, each network configuration mode has a corresponding network configuration instruction, where the network configuration instruction corresponding to the Bluetooth network configuration mode is a Bluetooth network configuration instruction, and the network configuration instruction corresponding to the WIFI network configuration mode is a WIFI network configuration instruction.

Referring to FIG. 4, optionally, after the mobile terminal establishes a Bluetooth connection with the home appliance whose network needs to be configured, the network configuration instruction can be sent to the home appliance by the mobile terminal through the Bluetooth communication, and the network access information of the wireless network access point and the mobile terminal information can be sent to home appliance through the Bluetooth communication. The mobile terminal information may be account information of a user of the mobile terminal registered on a home appliance server, device information of the mobile terminal (such as the device ID number, the device serial number, and the associated mobile phone number, etc.). The network access information of the wireless network access point includes a service set identifier (SSID) name of the wireless network access point which the current home appliance needs to access. Of course, when the wireless network access point needs a password, the network access information also includes password information corresponding to the wireless network access point.

Optionally, after the mobile terminal establishes a Bluetooth connection with the home appliance whose network needs to be configured, the mobile terminal can send a network configuration instruction to the home appliance through the Bluetooth communication, and receive the information of the wireless network access point returned by the home appliance. When the home appliance receives the network configuration instruction sent from the mobile terminal, the home appliance turns on a WIFI module to search for a wireless network, so as to detect a currently accessible wireless network access point, generate information of the detected currently accessible wireless network access point, and send the information of the wireless network access point to the mobile terminal through the Bluetooth communication. When the mobile terminal receives the relevant information of the wireless network access point sent from the home appliance, the mobile terminal generates and displays a wireless network access point setting UI interface (the UI interface includes a display list of wireless network access points accessible by the home appliance) according to the received information of the wireless network access point. In this way, the user can select a wireless network access point based on the UI interface according to actual needs, and input a password corresponding to a selected wireless network access point. The mobile terminal generates network access information of the wireless network access point according to the operation triggered by the user based on the UI interface, and sends the network access information of the wireless network access point and the mobile terminal information to the home appliance through the Bluetooth communication.

Optionally, after the mobile terminal establishes the Bluetooth communication with the home appliance, the mobile terminal can send a Bluetooth network configuration data packet to the home appliance through the Bluetooth communication, and the home appliance directly performs network configuration operation after receiving the Bluetooth network configuration data packet. The Bluetooth network configuration data packet includes the mobile terminal information and the network access information of the wireless network access point.

After receiving the mobile terminal information and the network access information of the wireless network access point transmitted from the mobile terminal through the Bluetooth communication, the home appliance can access the wireless network access point corresponding to the network access information to establish a network connection.

It should be noted that, in this way, when the network configuration of the home appliance is carried out for the first time (the network connection is not successfully established), network configuration data sent from the mobile terminal are received through the Bluetooth communication, and the communication between the home appliance and the mobile terminal can be realized.

The home appliance may send the mobile terminal information received from the mobile terminal to the server after the network communication is successfully established, or directly send the mobile terminal information to the server after the access point of the wireless network is successfully accessed. After receiving the mobile terminal information sent from the home appliance, the server can determine that the network configuration of the home appliance is successful. It should be noted that the server may be a dedicated online home appliance server, such as a home appliance server established by a home appliance manufacturer for providing online services of home appliances for a large number of users.

After determining that the network configuration of the home appliances is successful, the server can obtain the appliance information of the home appliance whose network configuration is successful at present, generate the message of successful network configuration of the home appliance corresponding to the appliance information, and then send the message of successful network configuration of the home appliance to the mobile terminal according to the mobile terminal information received from the home appliance. After receiving the message of successful network configuration of the home appliance pushed by the server, the mobile terminal displays the message of successful network configuration of the home appliance to prompt the user that the network configuration of the current home appliance has been successfully conducted.

In the existing technology, when a home appliance is successfully connected to a wireless network access point, it generally deems that the network configuration of the home appliance is successful, ignoring the possibility that the home appliance is only connected to the wireless network access point without establishing a real network communication connection (such as connecting to a server for online interaction and etc.), resulting in wrong determination of the network configuration. The server confirms the success of the network configuration of the home appliance, which can improve the stability of the network configuration of the home appliance and make the determining of the success of the network configuration of the home appliance more accurate.

Optionally, upon receiving the mobile terminal information sent from the home appliance, the server acquires the appliance information of the home appliance and associates the appliance information with the mobile terminal information. Then, after the user knows that the network configuration of the home appliance is successful through the mobile terminal, the user uses the mobile terminal to send a control instruction of controlling the home appliance to the server. When the server receives the control instruction from the mobile terminal, the server searches the associated appliance information according to the mobile terminal information corresponding to the mobile terminal, and sends the control instruction to the home appliance corresponding to the appliance information for the home appliance to execute the control instruction. In this way, the security of interaction between mobile terminals and home appliances can be improved, and illegal control of the home appliances by unknown mobile terminals can be prevented.

Optionally, the mobile terminal transmits the mobile terminal information and the network access information of the wireless network access point to the home appliance through the Bluetooth communication, and simultaneously transmits the mobile terminal information to the server. When the server receives the mobile terminal information transmitted from the home appliance, the server searches whether corresponding mobile terminal information is stored. If so, the server acquires the appliance information of the home appliance whose network configuration is successful, generates the message of successful network configuration of the home appliance corresponding to the appliance information, and then send the message of successful network configuration of the home appliance to the mobile terminal according to the mobile terminal information received from the home appliances. If not, it means that the home appliance does not have access to the server, and the server will not process it. In this way, the security of interaction among mobile terminals, home appliances and servers can be improved. Optionally, after the server receives the mobile terminal information sent from the mobile terminal, if no mobile terminal information corresponding to the mobile terminal information sent from the mobile terminal is received from the home appliance within a preset time period, the network configuration failure prompt message can be directly generated and pushed to the mobile terminal. The mobile terminal displays the received network configuration failure prompt message to remind the user that the current network configuration of the home appliances fails. It should be noted that the preset time period can be a preset network configuration duration, which can be 10 minutes, 15 minutes, 20 minutes, 30 minutes, or the like.

Optionally, after the mobile terminal transmits the mobile terminal information and the network access information of the wireless network access point to the home appliance via the Bluetooth communication, the mobile terminal sends an inquiry request about the home appliance to the server at preset time intervals. After the server receives the inquiry request, the server inquires whether the mobile terminal information corresponding to the mobile terminal information sent from the home appliance is received. If so, the server sends the message of successful network configuration corresponding to the home appliance to the mobile terminal, it should be noted that the preset time interval can be selected as 1 minute, 3 minutes, 5 minutes, or the like.

Optionally, after the mobile terminal transmits the mobile terminal information and the network access information of the wireless network access point to the home appliance via the Bluetooth communication, the mobile terminal determines that the network configuration of the home appliance fails when the message of successful network configuration of the home appliance is not received from the server within a preset time period, generates a network configuration failure message corresponding to the home appliance, and displays the network configuration failure message to prompt the user that the current network configuration of the home appliance fails.

In one embodiment, a mobile terminal transmits network access information of a wireless network access point and mobile terminal information to a home appliance through Bluetooth communication, where the home appliance is configured to transmit the mobile terminal information to a server under the condition of accessing the wireless network access point according to the network access information. The mobile terminal receives and displays a message of successful network configuration of the home appliance sent from the server, where the message of successful network configuration of the home appliance is sent by the server according to the mobile terminal information after confirming a success of the network configuration of the home appliance. In this way, it is convenient for users to configure the network of home appliances, simplifies the conventional network configuration operation based on the control panel or the remote controller of home appliances, and improves the network configuration experience of the users.

In addition, the present application also provides a home appliance, the home appliance includes a memory, a processor, and a network configuration program for home appliance stored in the memory and executable by the processor. When the processor executes the network configuration program for home appliance, the steps of the network configuration method for home appliance described in the above embodiments are realized.

In addition, the present application also provides a mobile terminal, the mobile terminal includes a memory, a processor, and a network configuration program for home appliance stored in the memory and executable by the processor. When the processor executes the network configuration program for home appliance, the steps of the network configuration method for home appliance described in the above embodiments are realized.

In addition, the present application also provides a computer-readable storage medium including a network configuration program for home appliance which, when executed by a processor, implements the steps of the network configuration method for home appliance described in the above embodiments.

The above numbering of the embodiments of the present application is for description only and does not represent the superiority and inferiority of those embodiments.

From the above description of embodiments, it will be apparent to those skilled in the art that the method of the above embodiments can be implemented by means of software plus a necessary general hardware platform, and of course can also by means of hardware, but in many cases the former is a preferred embodiment. Based on this understanding, the technical solutions of the present application can be embodied in the form of software products in essence or parts that contribute to the existing art. The computer software product is stored in a storage medium (e.g., a ROM/RAM, a magnetic disk, an optical disk) as described above, and includes instructions to perform the methods described in various embodiments of the present application with a configured terminal device (which may be a television, a mobile phone, a computer, a server, an air conditioner, a network device, etc.).

The above are only preferred embodiments of the present application, and do not limit the scope of the present application. Any equivalent structure or equivalent process transformation made by using the contents of the specification and drawings of the present application, or directly or indirectly applications in other related technical fields, are similarly included in the protection scope of the present application.

What is claimed is:

1. A network configuration method comprising:
    receiving, by a home appliance through Bluetooth communication, mobile terminal information and network access information of a wireless network access point sent by a mobile terminal, the mobile terminal information being sent to both the home appliance and a server;
    accessing the wireless network access point according to the network access information; and
    sending the mobile terminal information to the server for the server to:
        send a message of successful network configuration of the home appliance to the mobile terminal in response to receiving the mobile terminal information from the home appliance within a preset time period after receiving the mobile terminal information from the mobile terminal; and
        send a network configuration failure prompt message to the mobile terminal in response to not receiving the mobile terminal information from the home appliance within the preset time period after receiving the mobile terminal information from the mobile terminal.

2. The network configuration method according to claim 1, further comprising:
    upon receiving a network configuration instruction sent from the mobile terminal through the Bluetooth communication, the home appliance searching for an accessible wireless network access point and generating accessible wireless network access point information; and
    sending the accessible wireless network access point information to the mobile terminal through the Bluetooth communication for the mobile terminal to generate the network access information of the wireless network access point based on the accessible wireless network access point information.

3. The network configuration method according to claim 1, further comprising, prior to receiving the mobile terminal information and the network access information:
    upon receiving a network configuration instruction, determining whether the network configuration instruction is a Bluetooth network configuration instruction;
    wherein receiving the mobile terminal information and the network access information includes, upon determining that the network configuration instruction is the Bluetooth network configuration instruction, receiving, through the Bluetooth communication, the mobile terminal information and the network access information of the wireless network access point sent by the mobile terminal.

4. The network configuration method according to claim 1, further comprising, after accessing the wireless network access point according to the network access information:
    upon failing to access the wireless network, sending a network configuration failure prompt message to the mobile terminal through the Bluetooth communication.

5. The network configuration method according to claim 1, wherein the server is configured to acquire appliance information of the home appliance and generate the message of successful network configuration of the home appliance based on the appliance information upon confirming that the network configuration of the home appliance succeeds.

6. The network configuration method according to claim 1, further comprising, after sending the mobile terminal information to the server:
    receiving and executing a control instruction sent from the server, the control instruction being sent by the mobile terminal to the server.

7. A non-transitory computer readable storage medium storing a network configuration program that, when executed by a processor, causes the processor to perform the network configuration method according to claim 1.

8. A network configuration method comprising:
    sending, by a mobile terminal, network access information of a wireless network access point and mobile terminal information to a home appliance through Bluetooth communication, for the home appliance to send the mobile terminal information to a server upon accessing the wireless network access point according to the network access information, and sending, by the mobile terminal, the mobile terminal information to the server; and
    receiving and displaying, by the mobile terminal,
        a message of successful network configuration of the home appliance, the message of successful network configuration of the home appliance being sent by the server in response to the server receiving the mobile terminal information from the home appliance within a preset time period after receiving the mobile terminal information from the mobile terminal; and
a network configuration failure prompt message of the home appliance, the network configuration failure prompt message being sent by the server in response to the server not receiving the mobile terminal information from the home appliance within the preset time period after receiving the mobile terminal information from the mobile terminal.

9. The network configuration method according to claim 8, further comprising:
sending, by the mobile terminal, a network configuration instruction to the home appliance, to configure the home appliance to search for an accessible wireless network access point and generate accessible wireless network access point information;
receiving the accessible wireless network access point information sent from the home appliance through the Bluetooth communication; and
generating the network access information of the wireless network access point based on the accessible wireless network access point information.

10. The network configuration method according to claim 8, further comprising, after sending the network access information and the mobile terminal information to the home appliance:
regularly sending, by the mobile terminal, an inquiry request to the server to obtain the message of successful network configuration of the home appliance.

11. The network configuration method according to claim 8, further comprising, after sending the network access information and the mobile terminal information to the home appliance:
upon failing to receive the message of successful network configuration of the home appliance from the server within a preset time period, generating and displaying a network configuration failure message.

12. The network configuration method according to claim 8, further comprising, after sending the network access information and the mobile terminal information to the home appliance:
sending, by the mobile terminal, a control instruction of controlling the home appliance to the server, for the server to send the control instruction to the home appliance.

13. The network configuration method according to claim 8, wherein the server is configured to:
store the mobile terminal information sent from the mobile terminal; and
upon receiving the mobile terminal information sent from the home appliance and determining that the mobile terminal information sent from the home appliance corresponds to the stored mobile terminal information, send the message of successful network configuration of the home appliance to the mobile terminal according to the mobile terminal information.

14. A non-transitory computer readable storage medium storing a network configuration program that, when executed by a processor, causes the processor to perform the network configuration method according to claim 8.

15. A home appliance comprising:
a Bluetooth circuit configured to receive mobile terminal information and network access information of a wireless network access point sent from a mobile terminal, the mobile terminal information being sent to both the home appliance and a server;
a processor is configured to access the wireless network access point according to the network access information; and
a network communication circuit configured to send the mobile terminal information to the server for the server to:
send a message of successful network configuration of the home appliance to the mobile terminal in response to receiving the mobile terminal information from the home appliance within a preset time period after receiving the mobile terminal information from the mobile terminal; and
send a network configuration failure prompt message to the mobile terminal in response to not receiving the mobile terminal information from the home appliance within the preset time period after receiving the mobile terminal information from the mobile terminal.

16. The home appliance according to claim 15, wherein the processor is further configured to:
upon receiving a network configuration instruction sent from the mobile terminal through the Bluetooth circuit, search for an accessible wireless network access point and generate accessible wireless network access point information; and
send the accessible wireless network access point information to the mobile terminal through the Bluetooth circuit for the mobile terminal to generate the network access information of the wireless network access point based on the accessible wireless network access point information.

17. The home appliance according to claim 15, wherein the processor is further configured to, prior to receiving the mobile terminal information and the network access information:
upon receiving a network configuration instruction, determine whether the network configuration instruction is a Bluetooth network configuration instruction; and
upon determining that the network configuration instruction is the Bluetooth network configuration instruction, receive, through the Bluetooth circuit, the mobile terminal information and the network access information of the wireless network access point sent by the mobile terminal.

18. The home appliance according to claim 15, wherein the processor is further configured to, after accessing the wireless network access point according to the network access information:
upon failing to access the wireless network, send a network configuration failure prompt message to the mobile terminal through the Bluetooth circuit.

19. The home appliance according to claim 15, wherein the processor is further configured to, after sending the mobile terminal information to the server:
receiving and executing a control instruction sent from the server, the control instruction being sent by the mobile terminal to the server.

20. A mobile terminal comprising:
a Bluetooth circuit configured to send network access information of a wireless network access point and mobile terminal information to a home appliance, for the home appliance to transmit the mobile terminal information to a server upon accessing the wireless network access point according to the network access information, and configured to send the mobile terminal information to the server;
a network communication circuit configured to receive:
  a message of successful network configuration of the home appliance, the message of successful network configuration of the home appliance being sent by the server in response to the server receiving the mobile terminal information from the home appliance within a preset time period after receiving the mobile terminal information from the mobile terminal; and
  a network configuration failure prompt message of the home appliance, the network configuration failure prompt message being sent by the server in response to the server not receiving the mobile terminal information from the home appliance within the preset time period after receiving the mobile terminal information from the mobile terminal; and
a display screen configured to display the message of successful network configuration of the home appliance and the network configuration failure prompt message of the home appliance.

\* \* \* \* \*